United States Patent Office 2,816,822
Patented Dec. 17, 1957

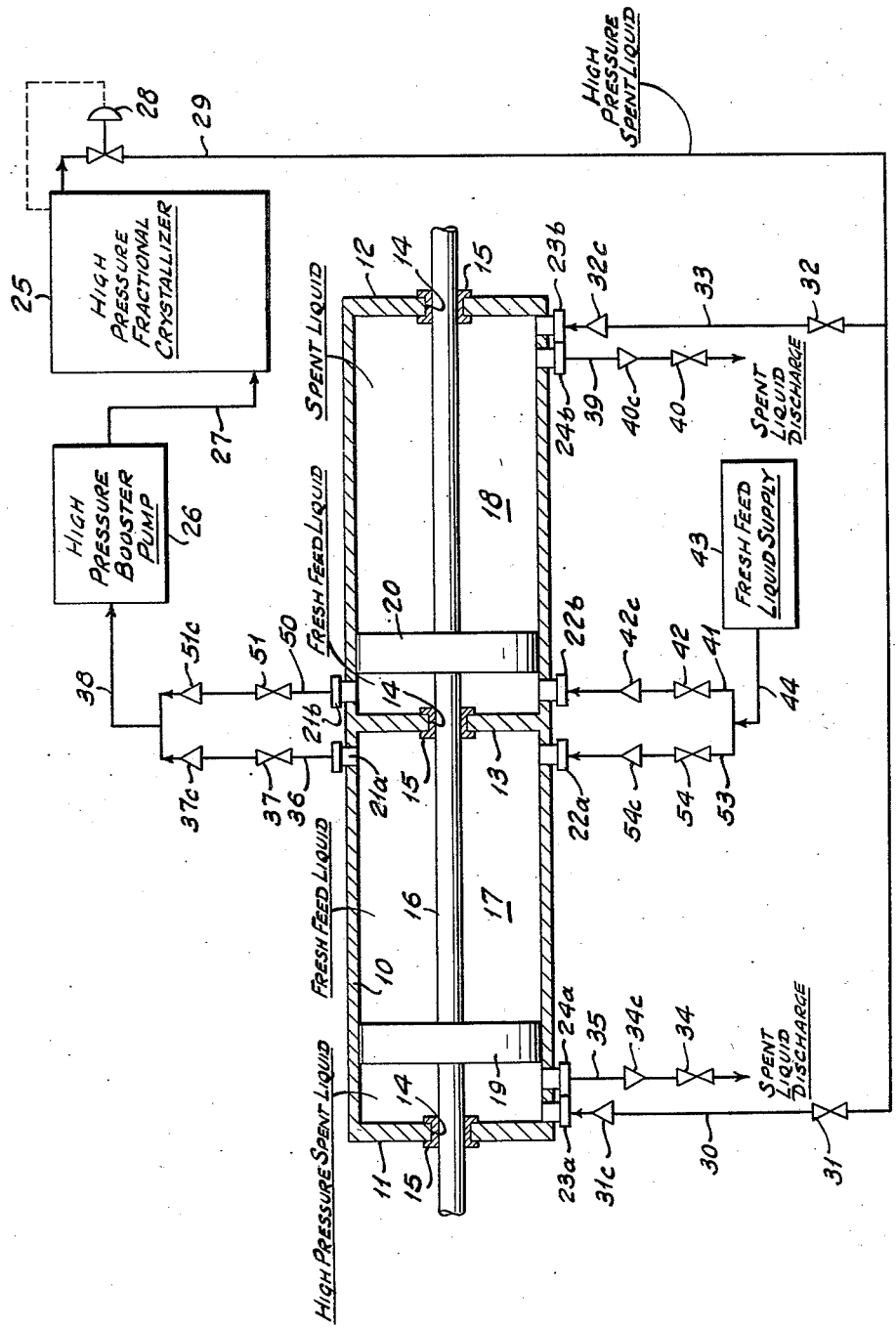

2,816,822

HIGH PRESSURE CRYSTALLIZATION APPARATUS CONTAINING A FLUID PRESSURE TRANSFER DEVICE

Howard V. Hess, Glenham, and Charles A. Coghlan, Beacon, N. Y., assignors to The Texas Company, New York, N. Y., a corporation of Delaware Application August 31, 1954, Serial No. 453,227

2 Claims. (Cl. 23—273)

This invention relates to a fluid transfer device and to an apparatus employing the same.

In the co-pending, co-assigned patent application Serial No. 437,790, filed June 18, 1954, in the name of Howard V. Hess, one of the co-inventors of this invention, there is described a method of fractional crystallization wherein a liquid mixture containing material to be separated by fractional crystallization is subjected to an elevated pressure whereby precipitation (crystallization) and separation of said material is effected at a temperature substantially higher than that at which precipitation would have taken place in the absence of elevated pressure. In the above-referred method there issues from the fractional crystallization zone a spent liquid (mother liquor) at an elevated pressure substantially the same or somewhat less than the operating pressure employed in a fractional crystallization zone. In the operation of the above-referred method a substantial portion of the energy requirements and operating costs is represented by the energy required to maintain the liquid in the fractional crystallization zone at the desired operating high pressure. It is also obvious that a substantial portion of the energy originally imparted into the fresh feed liquid within the high pressure fractional crystallization zone is contained in the high pressure spent liquid issuing therefrom. Accordingly, it is desirable from the viewpoint of reducing operating costs to recover or capture this energy as embodied by the high pressure of the spent liquid and to employ the same to pressure fresh feed liquid prior to the injection of the same into the high pressure fractional crystallization zone.

Accordingly, it is an object of this invention to provide an apparatus wherein high pressure fluid, such as the above-mentioned spent liquid, can be employed to pressure another fluid, such as the above-mentioned fresh feed liquid.

It is another object of this invention to provide an apparatus for recovering the pressure energy of a fluid stream and imparting the same to another fluid stream.

Still another object of this invention is to provide a device suitable for use in a high pressure fractional crystallization operation.

Still another object of this invention is to provide an improved apparatus for carrying out a high pressure fractional crystallization operation.

In at least one embodiment of this invention at least one of the foregoing objects will be achieved.

How these and other objects are attained will become apparent in the light of the accompanying disclosure and drawing which illustrates in vertical cross-section a fluid pressure transfer device in accordance with our invention and which also schematically illustrates how such a device can be employed in a high pressure fractional crystallization operation in accordance with a practice of our invention.

Referring now in detail to the drawing, there is illustrated a high pressure vessel such as a cylinder 10 which is provided with partitions 11 and 12 closing the opposite ends thereof. A partition 13, like partitions 11 and 12, preferably fixed to and integral with the body of cylinder 10 is positioned transversely of cylinder 10 preferably half way between partitions 11 and 12. Each of partitions 11, 12 and 13 are provided with an opening 14 therethrough and within which is fitted bushing 15 or similar member which provides a fluid tight fitting with piston rod 16 which slidably operates therein in a reciprocating manner and which extends axially and longitudinally within cylinder 10. As indicated in the drawing, piston rod 16 extends beyond the opposite ends of the cylinder 10 a sufficient distance so that piston rod 16 is always operative within bushings 15 as piston rod 16 reciprocates within cylinder 10.

Partition 13 divides cylinder 10 into chambers 17 and 18, respectively, each having substantially the same volume and dimensions. Positioned within chambers 17 and 18 are pistons 19 and 20, respectively, which are fixed to and preferably integral with piston rod 16. Pistons 19 and 20 are adapted to operate within chambers 17 and 18 of cylinder 10 in piston-cylinder relationship therewith. Outlets 21a and 21b are provided for chambers 17 and 18, respectively, located adjacent the juncture of cylinder 10 and partition 13. These outlets, 21a and 21b, are provided for the egress of fluid from chambers 17 and 18, respectively. Outlets 22a and 22b, preferably diametrically opposed from outlets 21a and 21b, respectively, are also provided in the walls of cylinder 10 in a similar manner as outlets 21a and 21b but for the introduction of fluid into chambers 17 and 18, respectively. In the walls of cylinder 10 at the opposite ends thereof there are provided outlets 23a and 23b, preferably located adjacent the juncture of partitions 11 and 12, respectively, with the walls of cylinder 10, for the introduction of fluid to chambers 17 and 18, respectively. In a similar manner outlets 24a and 24b are provided, adjacent or diametrically opposed from outlets 23a and 23b, respectively, for the egress of fluid from chambers 17 and 18, respectively. Suitable conduits and flow control means are also provided in accordance with our invention, as indicated in the drawing, when the above-described fluid pressure transfer device is employed in a high pressure fractional crystallization operation.

The operation of the fluid pressure transfer device of our invention as employed in a high pressure fractional crystallization operation will now be described. High pressure fractional crystallizer 25 is completely filled with a fresh feed liquid, such as a petroleum fraction containing paraxylene, e. g. a petroleum fraction having the following composition:

| Component: | Volume percent |
|---|---|
| Ortho-xylene | 0–30 |
| Meta-xylene | 50–70 |
| Ethylbenzene | 0–20 |
| Para-xylene | 10–40 |
| Saturated hydrocarbons | 0–30 | from which para-xylene is to be separated by high pressure fractional crystallization in the manner described in the above-identified co-pending patent application. Additional fresh feed liquid is continuously injected into the crystallizer 25 by means of high pressure booster pump 26 via conduit 27. The operating high pressure, e. g. about 50,000 p. s. i. g., is maintained within crystallizer 25 by means of pressure-flow regulator 28 which controlledly regulates the amount of spent liquid, now having a reduced para-xylene content, which issues from crystallizer 25. The spent liquid which issues from crystallizer 25 via pressure-flow regulator 28 and conduit 29 will be at a substantial elevated pressure, for instance, within the range 40,000–49,000 p. s. i. g. when crystallizer 25 is operated at about 50,000 p. s. i. g.

In the practice of our invention, as indicated in the drawing, this high pressure spent liquid in conduit 29 is introduced into chamber 17 of cylinder 10 via conduit 30, valve 31, check valve 31c, and inlet 23a, check valve 31c being adapted to permit fluid flow only in the direction into chamber 17. As this takes place valve 32 in conduit 33, which is also provided with a check valve 32c of the same type as check valve 31c, is closed. As the high pressure spent liquid is introduced into chamber 17, piston 19 is moved to the right. At the same time that the high pressure spent liquid is injected into chamber 17, valve 34 in conduit 35, which is also provided with a check valve 34c, is closed to prevent the escape of any of the injected high pressure spent liquid from chamber 17. Check valve 34c is adapted to permit only the egress of fluid from chamber 17 via outlet 24a.

As piston 19 is moved to the right the fresh feed liquid contained within chamber 17 on the other side of piston 19 from the spent liquid is discharged therefrom via outlet 21a, conduit 36, valve 37 and check valve 37c which is adapted to permit only the flow of liquid from chamber 17. This discharged fresh feed liquid, previously within chamber 17, is introduced via conduit 36 into conduit 38 to the intake of high pressure booster pump 26 where its pressure is increased for injection into a high pressure crystallizer 25. As piston 19 is moved to the right by the high pressure spent liquid introduced into chamber 17 via conduit 30, piston 20 is also moved to the right to the same extent since both pistons 19 and 20 are fixed to piston rod 16. As piston 20 moves to the right the spent liquid within chamber 18 (on the right side of piston 20 as indicated in the drawing) is discharged therefrom via outlet 24b and conduit 39 which is provided with valve 40 and check valve 40c which is adapted to permit only the egress of fluid from chamber 18. As this spent liquid is displaced from chamber 18 by piston 20 fresh feed liquid is introduced into chamber 18 on the opposite side of piston 20 from the spent liquid via inlet 22b and conduit 41 which is provided with valve 42 and check valve 42c, check valve 42c being adapted to permit fluid flow only in the direction of chamber 18. Conduit 41 is supplied with fresh feed liquid from tank 43 via conduit 44.

Accordingly, as described above, as pistons 19 and 20 move to the right fresh feed liquid is supplied under pressure from chamber 17 into the intake of high pressure booster pump 26 and simultaneously spent liquid is discharged from chamber 18 via conduit 39, respectively. After the movement of pistons 19 and 20 to the right has been completed the operation is reversed and valves 40 and 31 closed and valves 32 and 34 opened. When this is done the high pressure spent liquid in conduit 29 is introduced into chamber 18 via conduit 33 and inlet 23b so as to cause pistons 20 and 19 to move to the left. As piston 20 moves to the left the fresh feed liquid which was previously supplied to chamber 18 via conduit 41 from supply tank 43 is pressurized and discharged to pump 26 via outlet 21b, conduit 50, valve 51, check valve 51c and conduit 38, check valve 51c being adapted to permit fluid flow only in the direction away from chamber 18. At the same time as piston 20 moves to the left piston 19 also is moving to the left to discharge previously introduced spent liquid from chamber 17 via outlet 24a and conduit 35. As piston 19 moves to the left additional fresh feed liquid is introduced into chamber 17 from supply tank 43 via conduits 44, 53, valve 54, check valve 54c and inlet 22a, check valves 54c being adapted to permit fluid flow only in the direction of chamber 17.

The operation of the subject fluid pressure transfer device and the advantages to be obtained by employing the same in a high pressure fractional crystallization operation in accordance with our invention are believed to be apparent in the light of the foregoing disclosure and explanation, at least to the extent that spent high pressure liquid issuing from crystallizer 25 is employed to pressurize additional fresh feed liquid prior to injection of the same into crystallizer 25 via booster pump 26.

For purposes of simplification and clarity the various well known automatic flow control and regulating devices for operating (opening and closing) the valves in the desired operating sequence outlined and disclosed hereinabove have not been shown in the drawing since they are considered to be well known in the art and their application in the practice of this invention obvious. For example, after completion of travel of pistons 19 or 20 to the right suitable means (electrically, hydraulically or mechanically operated) can be employed operative therewith at this point of their travel to close valves 31 and 40 and open valves 34 and 32. In like manner when piston 19 or 20 has completed its travel to the left suitable control equipment operative at this point can be employed to open valves 31 and 40 and close valves 32 and 34. In this manner the above-described fluid pressure transfer device, as employed in the high pressure fractional crystallization, can be made to operate substantially automatically and continuously.

As will be apparent to those skilled in the art in the light of the foregoing disclosure many substitutions, changes and alterations are possible without departing from the spirit and scope of this invention.

We claim:

1. An apparatus suitable for use in a high pressure fractional crystallization operation comprising in combination a high pressure fractional crystallizer, a discharge conduit for the discharge of high pressure spent liquid from said crystallizer, a booster pump for supplying high pressure fresh liquid to said crystallizer and pressure transfer means connected at one end in direct fluid communication with said pump for supplying pressurized fresh liquid to said pump, said fresh liquid being pressurized by said high pressure spent liquid from said discharge conduit, said fluid transfer means being positioned in direct fluid flow relationship between said conduit and said pump and comprising an elongated vessel, an end closure provided at each end of said vessel and a partition intermediate the ends thereof, said intermediate partition dividing said vessel into two chambers and each of said closures and said partition being provided with an opening therethrough, a piston rod centrally and longitudinally disposed within said vessel passing through said openings and extending beyond the ends of said vessel, a piston fixed to said piston rod within each of said chambers, one of said pistons being adapted to operate in a reciprocating manner within said vessel in piston-cylinder relationship therewith between one side of said intermediate partition and one end of said vessel, another piston being adapted to operate in a reciprocating manner within said vessel in piston-cylinder relationship therewith between the other side of said partition and the other end of said vessel, unidirectional flow control means in fluid communication with said vessel adjacent said intermediate partition and adjacent the ends of said chambers for the introduction of fluid into each of said chambers and additional unidirectional flow means in fluid communication with said vessel adjacent said intermediate partition and adjacent the ends of said chambers for the flow of fluid away from each of said chamber.

2. An apparatus suitable for use in a high pressure fractional crystallization operation comprising in combination a high pressure fractional crystallizer, a discharge conduit for the discharge of high pressure spent liquid from said crystallizer, a booster pump for supplying high pressure fresh liquid to said crystallizer and pressure transfer means connected at one end in direct fluid communication with said pump for supplying pressurized fresh liquid to said pump, said fresh liquid being pressurized by said high pressure spent liquid from said discharge conduit, said fluid transfer means being positioned in direct fluid flow relationship between said conduit and said pump and comprising an elongated cylinder, end closures closing the opposite ends of said cylinder and a partition positioned intermediate the ends of said cylinder dividing said cylinder into two chambers, each of said closures and said partition being provided with an opening therethrough, a piston rod slideably positioned within each of said openings and extending beyond the ends of said cylinder, two pistons fixed to said piston rod, one of said pistons being adapted to operate in piston-cylinder relationship with said cylinder within one of said chambers and the other said piston being adapted to operate in piston-cylinder relationship with said cylinder in the other of said chambers, and means for introducing fluid into said cylinder at the adjacent ends of said chamber, means for the withdrawal of fluid from said cylinder at the adjacent ends of said chambers, means for the introduction of fluid into said cylinder at the opposite ends thereof and means for discharging fluid from said cylinder at the opposite ends thereof.

References Cited in the file of this patent

UNITED STATES PATENTS

| | | |
|---|---|---|
| 46,219 | Dennisson | Feb. 7, 1865 |
| 71,287 | Dennisson et al. | Nov. 26, 1867 |
| 1,408,092 | Keller | Feb. 28, 1922 |
| 2,239,727 | Mayer | Apr. 29, 1941 |
| 2,336,446 | Tucker et al. | Dec. 7, 1943 |
| 2,549,848 | Otto | Apr. 24, 1951 |
| 2,617,274 | Schmidt | Nov. 11, 1952 |
| 2,737,440 | Roberts et al. | Mar. 6, 1956 |
| 2,747,001 | Weedman | May 22, 1956 |

FOREIGN PATENTS

| | | |
|---|---|---|
| 1,229/26 | Great Britain | Mar. 29, 1927 |